Nov. 28, 1961 T. YOUNG 3,010,545
BRAKE

Filed Sept. 19, 1958 3 Sheets-Sheet 1

INVENTOR.
THOMAS YOUNG
BY
Jerome R. Cox
ATTORNEY

Nov. 28, 1961 T. YOUNG 3,010,545
BRAKE
Filed Sept. 19, 1958 3 Sheets-Sheet 2

INVENTOR.
THOMAS YOUNG
BY
Jerome R. Cox
ATTORNEY

Nov. 28, 1961     T. YOUNG     3,010,545
BRAKE

Filed Sept. 19, 1958     3 Sheets-Sheet 3

INVENTOR.
THOMAS YOUNG
BY
Jerome R. Cox
ATTORNEY

United States Patent Office 3,010,545
Patented Nov. 28, 1961

3,010,545
BRAKE
Thomas Young, 22 W. Main St., Pomeroy, Ohio
Filed Sept. 19, 1958, Ser. No. 761,992
1 Claim. (Cl. 188—90)

The inventions disclosed and illustrated in this application relate to hydraulic brakes and in the embodiment disclosed show a brake designed primarily for use in connection with an automotive vehicle, but it is to be understood that hydraulic brakes in accordance with the inventions disclosed herein may be employed in any connection in which they may be found applicable.

"Hydraulic brake," as used herein, is intended to mean a brake which depends for its retarding force upon the movement of a hydraulic liquid or fluid through more or less constricted passages as distinguished from "friction brakes" wherein solid brake shoes engage with solid brake drums. This distinction is necessary because it is realized that the term "hydraulic brake" is sometimes used to designate a "friction brake" which is hydraulically actuated.

Heretofore many hydraulic brakes have been designed in which the decelerating force of a constriction of the movement of the hydraulic fluid is depended upon for deceleration. However, in most of the hydraulic brakes heretofore designed, great complications are introduced in the operation thereof or otherwise. The present invention utilizes the principle of a combination of rotary and stationary elements with a fluid space provided therebetween; and means for normally maintaining the stationary and rotary parts in substantially concentric relationship with each other to enable free running of the rotary parts to be had; combined with means for shifting the stationary and rotary parts relative to each other to change their relationship from concentricity to eccentricity. In some respects, my device is thus like many of the previously designed hydraulic brakes, yet my device differs from prior devices in the simplicity of operation and in that the movable pressure controller herein is itself a rectangular (square or oblong) piston which is hollowed out to form a chamber in which the rotary member rotates. This piston is at times moved so as to make the chamber become eccentric relative to the rotatable member. In some other prior art hydraulic brakes in which rotary and stationary elements with a fluid space between them are utilized, one of the parts is moved from the substantially concentric relationship in which there is free running of the rotary parts to a relationship in which the parts are eccentric to provide braking force to the rotary parts, but in such cases the arrangement is so complicated that it is difficult to design, construct and maintain such systems.

One of the objects of this invention is the provision of a hydraulic brake structure which is simple in design, can be readily constructed and installed, and is reliable to maintain and operate.

A further object of my invention is the provision of a hydraulic brake structure of the class described in which a movable piston or controller which forms the stator member is provided with a hydraulic fluid chamber within which chamber there is positioned a rotatable shaft to be braked.

A further object of my invention is the provision in such a device of a rotor element which is always and at all speeds in perfect balance and can therefore be operated efficiently and reliably at high speeds.

A further object of my invention is the provision of wiper vanes which are carried by the rotor member and cooperate with the stator member or controller but yet normally exert no pressure on the stator member in any direction and never exert any appreciable pressure thereon.

Further objects and features of my invention will be apparent from the following specification and claim when considered in connection with the accompanying drawings illustrating embodiments of my invention.

Figure 1:
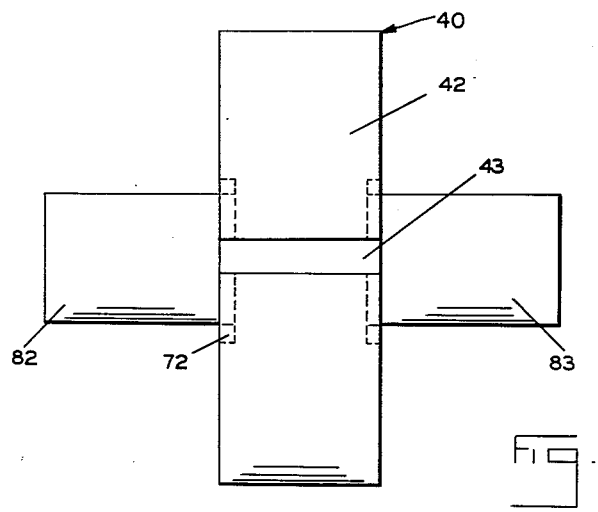
FIG. 1 is a plan view of the rotor member of an embodiment of my invention.

In general, the embodiment of my invention disclosed comprises in combination (see FIG. 4) a hollow container 11 formed with a substantially rectangular inner space 12 in which there is positioned a movable piston 13 (shown also in FIG. 2) through which there passes a driveshaft 14. A rotor member 40 (shown also in FIG. 1) later to be described in detail is carried by and splined to shaft 14 and is provided with vanes such as 15, 16, 17 and 18. Means are provided for shifting the piston 13 vertically of the casing 12 as will be described in detail later.

Referring still to the drawings, and especially to FIGS. 1–4 inclusive, for a more detailed description of the embodiment of my invention, it may be seen that I have shown the casing 11 formed of an open ended box-like central member 20 clamped between a pair of cooperating halves 21 and 22 (see FIG. 5) secured together by suitable means such as bolts 23 and 24. On opposite sides of the halves 21 and 22 I provide plates 27 and 28 which are secured to the halves 21 and 22 by the bolts 25, 26, 25a and 26a. Extending through the elements 21, 22, 27 and 28, concentrically thereof, is a cylindrical opening 29 through which the member 40 and the shaft 14 extend. I provide bearings 31, 32, 33 and 34 for supporting the member 40 and shaft 14 within the opening 29 and I provide neoprene pressure oil seals 35, 36, 37 and 38 for sealing said opening 29 in order to prevent oil or other hydraulic fluid used in the device from seeping out along the rotor member 40. It will be noted that the arrangement of the bearings and seals on opposite sides of the inner space 12 is not symmetrical. I prefer to use a symmetrical arrangement (i.e. an arrangement of the bearings 31 and 32 and the seals 35 and 38 on both sides of the device). However, I may use the arrangement of the bearings 33 and 34 and the seals 36 and 37 on both sides. Finally, I may use the arrangement as shown if desired.

I have shown the shaft 14 as one-piece or integral and extending through the device. However, the rotor member 40 may also serve as a connector between the ends 14a and 14b thereof such ends being separate and being respectively a driving shaft and a driven shaft.

As stated above, the rotor member 40 is formed with cylindrical disc 42 which fits snugly between the halves 21 and 22. The radius of the disc 42 is (as shown in FIG. 1) considerably greater than the radius of the shaft. The circumference of said disc 42 is concentric with shaft 14 and inasmuch as the member 40 is keyed to the shaft 14, the disc 42 thus rotates with the shaft 14 in the space 12 between the halves 21 and 22. The disc 42 is formed with a plurality of rectangular pockets such as the slots or pockets 43, 44, 45 and 46. Within each of the pockets 43, 44, 45 and 46 are a pair of springs such as springs 48, 48a, 48b, and 48c, and a stepped piston 49. The stepped pistons 49 include the enlarged portions 51 and the vane portions 52, and the stepped pistons 49 comprise the vanes 15, 16, 17 and 18 previously referred to. Inasmuch as the member 40 is keyed to the shaft 14, it, as well as its disc 42, rotates with the shaft 14 and the vanes 15, 16, 17 and 18 are carried with it in its rotation so that the outer ends or vane portion 52 of the vanes, rotate close to the inner surface of the substantially cylindrical hollow of the rectangular piston 13 when said piston is in the non-braking position.

The member 40 includes in addition to the disc 42, an elongated sleeve 81 formed internally with splines which match the splines at 41 of the shaft 14 and inter-engage therewith so that the member 40 turns always with the shaft 14. The elongated sleeve of the member 40 comprises also two oppositely extending portions 82 and 83 which extend outward along the shaft 14 in opposite directions from the disc 42 so that the shaft 14 is firmly embraced therebetween. The sleeve 81 including the portions 82 and 83 obviously turns with the shaft 14 and is mounted for rotation in the bearings 31, 32, 33 and 34 and is contacted by the seals 35, 36, 37, and 38. The rotor member 40 as shown in FIG. 1 is an integral unit made up of the disc 42 and the elongated sleeve 81 which itself consists of two oppositely extending portions 82 and 83. It is obvious that this unit could consist of a unitary member as shown or could consist of a separate disc to which there is secured one or more sleeves extending longitudinally through an opening in the disc.

Figure 2:
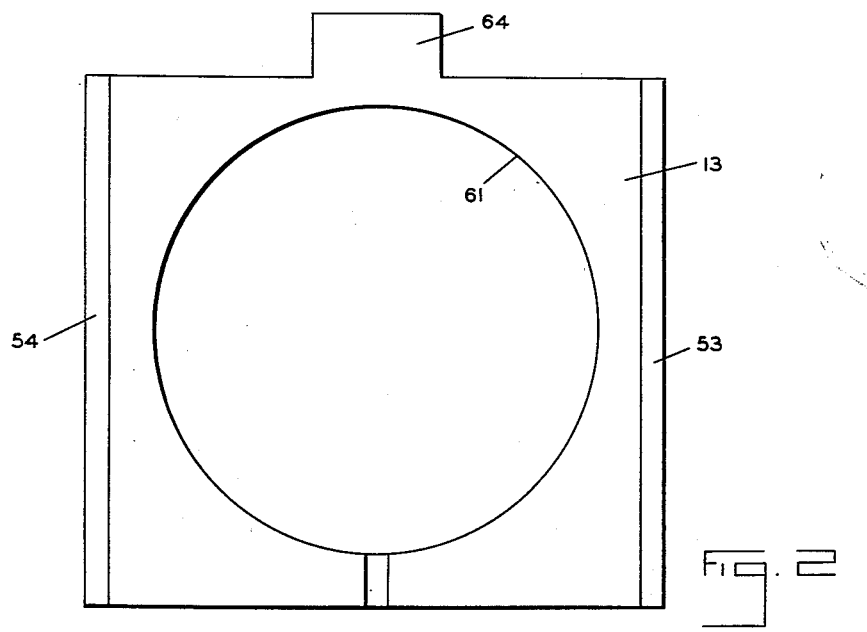
FIG. 2 is a view in side elevation of the stator member or movable piston of said embodiment.
Figure 3:
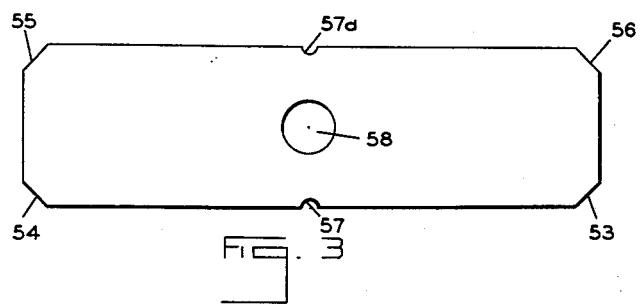
FIG. 3 is a bottom plan view of the stator member or movable piston shown in FIG. 2.

The hollow piston 13 is substantially rectangular in external shape as shown in FIG. 2, but is formed with a cylindrical hollow 61 and is formed with bevelled edges as shown at 53, 54, 55 and 56 (see FIG. 3) and with grooves such as the grooves 57 and 57a. These edges and the grooves are provided for the purpose of allowing the passage of oil upward or downward in the inner space 12 as the piston 13 moves downward and upward in said space. The piston 13 is also formed with a hole 58 for the reception of the upper end of spring 59 which is provided for resiliently urging the piston 13 upward. It is formed with the cylindrical hollow 61 in which the enlarged disc 42 is positioned and through which the shaft 14 extends. Normally the shaft 14 and the disc 42 are concentric with the cylindrical hollow 61. However, as will be later described, the piston 13 may be moved downward against the force of the spring 59 to such position that the cylindrical hollow is moved to the position shown by the dotted line 62 in FIG. 4. In such position the vane 15 will be moved inward in its pocket 43 compressing its spring 48. The vanes 16, 17 and 18 are prevented from moving outward by contact of the enlarged portions 49 with the lips or ledges 50, formed at the outer ends of pockets 43—46 inclusive. It is to be understood that the vanes 15, 16, 17 and 18 and their associated springs 48, 48a, 48b and 48c are inserted in the slots or pockets 43, 44, 45 and 46 from the side either before the rotor member 40 is assembled around the shaft 14 and/or in the stator member 13 or after such assembly but before the half 21 or 22 is fastened in place. As stated above, the vanes 15, 16, 17, 18 do not contact the surface of the stator member 13 when the stator member is in non-braking position. However, when the stator member 13 is moved down to braking position the upper vane or vanes wipe the surface of the stator member and force the hydraulic fluid through the constricted passageways provided along the sides of the vanes and past the loose seal where the vanes contact the cylindrical surface and thus exert braking force. It is to be understood that, if desired, special grooves could be provided in the sides and ends of the vanes 15, 16, 17 and 18 so that any desired amount of liquid could pass by thus forming other passages in addition to the constricted passages referred to above. However, even without any special grooves the vanes 15, 16, 17 and 18 are not machined to such a fine degree and the surfaces against which they press are not machined to such a fine degree that liquid cannot escape even in the absence of having special grooves formed therein. Thus there are naturally passageways for fluid provided by the sides and ends of the vanes. However, due to the fact that these passageways are restricted, the liquid flows through slowly and a braking force is thus provided which acts when desired against the rotation of the shaft 14.

The hollow container 11 is provided with a pocket 63 in the lower portion 20a of member 20 into which the lower end of the spring 59 extends to give it a foundation for pressing against the piston 13 and urging the piston upward.

Figure 4:
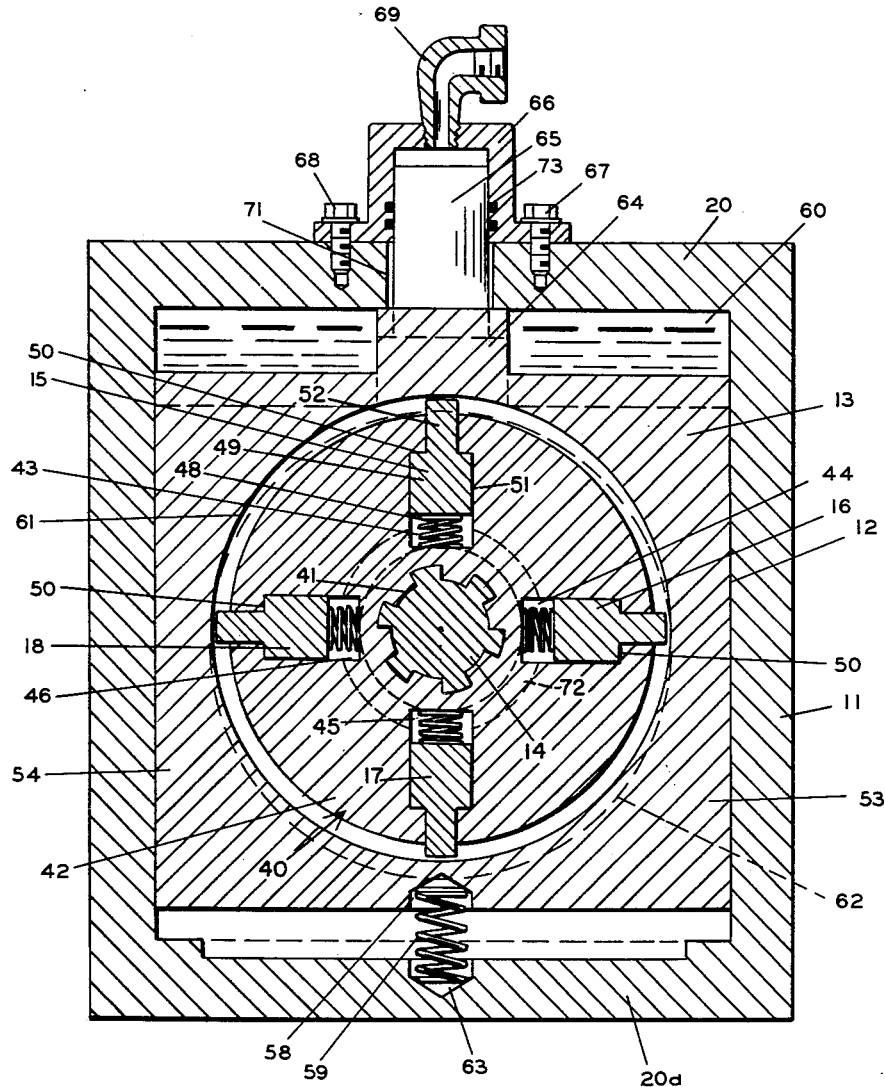
FIG. 4 is a view in vertical section of said embodiment of my invention, the view being taken transversely of a driveshaft which is to be braked by the hydraulic brake of my invention and centrally of the rotor and stator members.

Liquid partially fills the inner hollow of the hollow container 11 and may, if desired, extend upward to the position 60 as shown in FIG. 4.

Means are provided so that the piston 13 may be moved from its upward concentric position as shown in FIG. 4 to a downward position in which the cylindrical hollow thereof is eccentric of the shaft 14 and the disc 42 such as for example the position shown in dotted lines 62 of FIG. 4. To this end the hollow piston 13 is formed with an upward extension 64 on which there bears a hydraulic piston 65 positioned in a hydraulic cylinder 66 secured as by bolts 67 and 68 to the upper part of the container 11 and having secured to the upper end thereof a nipple 69 through which hydraulic fluid may be introduced to force the piston 65 downward into contact with the extension 64. The member 20 of the container 11 is as shown provided with an opening 71 through which the piston 65 extends.

Pockets or bores such as the pocket 72 (FIG. 1, FIG. 4 and FIG. 5) are provided in the member 40 for the circulation of oil between pockets 43, 44, 45 and 46, and oil seals such as seals 73 (FIG. 4) are provided for the sealing of the passage of the piston 65. The purpose of the pockets or bores 72 is to equalize pressure behind the vanes 15, 16, 17 and 18 in the pockets 43, 44, 45 and 46. The pockets or bores 72 are circumferential passages or grooves shown in FIGS. 1, 4 and 5, but possibly shown best in FIG. 1, it being understood that these grooves extend circumferentially completely around the disc 42 on each side of said disc and thus connect the pockets 43, 44, 45 and 46 to each other.

Figures 5, 6:
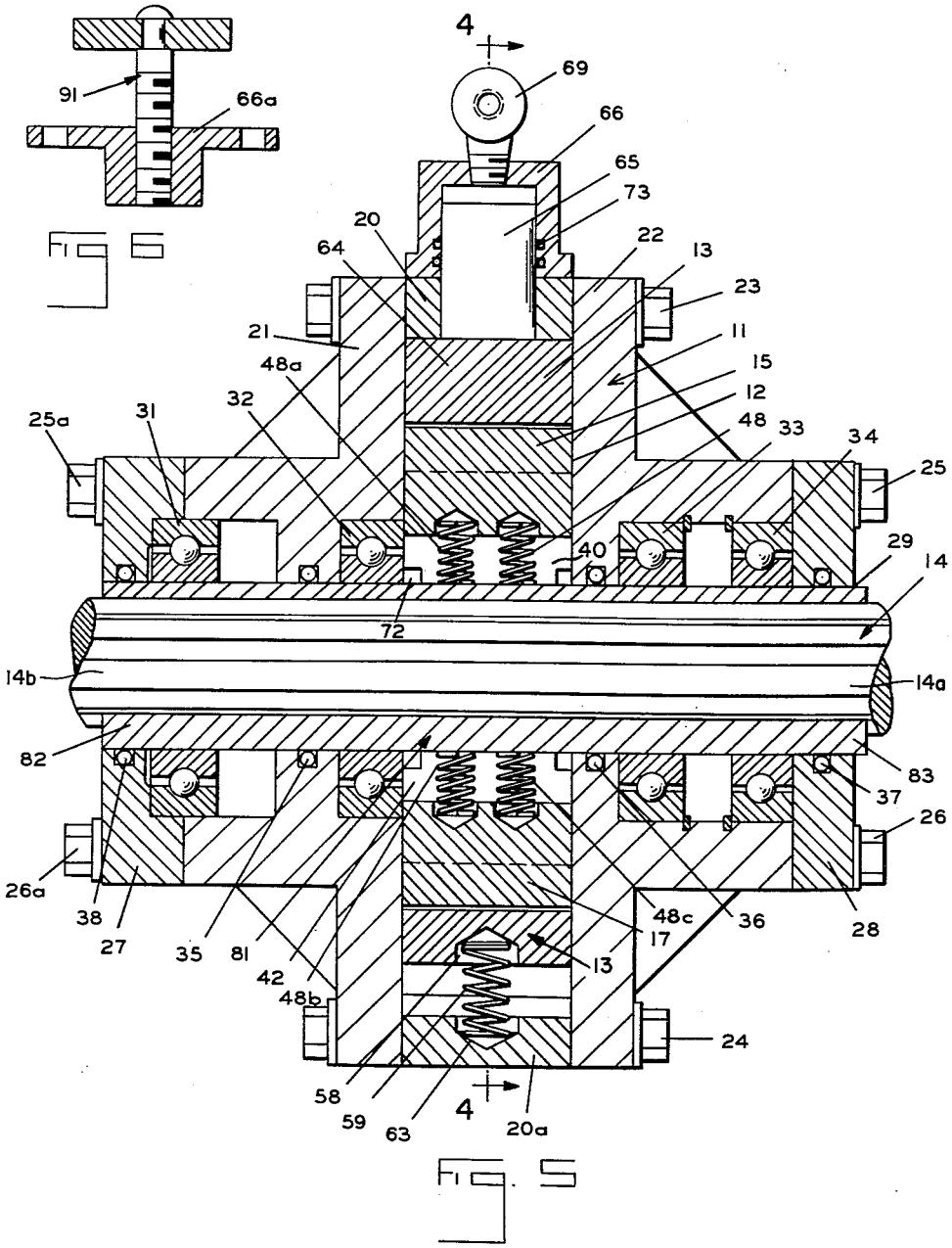
FIG. 5 is a view in vertical section of the same embodiment shown in FIGS. 1–4 taken at right angles to FIG. 4 substantially at the central line thereof.
FIG. 6 is a vertical section of a fragmentary portion of an alternative embodiment of the hydraulic brake constructed according to my invention showing an alternative means for shifting the piston of the device shown in FIGS. 1–5 inclusive.

In FIG. 6 I have shown another embodiment of means for moving the rectangular piston 13 from its concentric position to its eccentric position. Therein there is provided a screw 91 which is threaded into a threaded bore in a bracket 66a secured to the top of the upper part of the container 11 in the same manner as is the cylinder 66 in the first embodiment. The screw 91 bears upon the upright extension 64 and may be manually operated to force the piston 13 downward from the concentric position shown in FIG. 4.

It is to be understood that the above described embodiments of my invention are for the purpose of illustration only and various changes may be made therein without departing from the spirit and scope of the invention.

I claim:

A brake comprising in combination, a body member formed of a plurality of parts bolted together and forming a container having side walls and provided with a substantially rectangular inner space which is at least partially filled with liquid; a substantially rectangular hollow piston positioned in said inner space, slidable vertically therein, and formed with a substantially cylindrical hollow extending axially of the piston and of the container; a rotatable shaft extending axially through the inner space of the container and axially through the cylindrical hollow of the piston and having the cylindrical hollow at times positioned concentrically about said shaft;

a supporting member comprising a sleeve keyed to said shaft including a central portion and a pair of outwardly extending sleeve portions extending out axially of said shaft from said central portion and surrounding said shaft, and the sleeve portions being supported by said shaft; and a disc member secured to said central portion of said sleeve and supported thereby and extending radially outward therefrom into the inner space of the body and the cylindrical hollow of said piston and formed with a plurality of pockets having restrictions at their outer ends; bearings mounted in said body member and supporting said outwardly extending sleeve portions; vanes which are positioned in said pockets and which when extended have the outer portions of their sides closely adjacent to the side walls of said container to prevent substantial leakage of fluid past such sides; means comprising the restrictions at the outer ends of said pockets for limiting the outward movement of said vanes for preventing the vanes from contacting the inner surface of the cylindrical hollow of the piston when the central hollow is positioned concentrically about the shaft; means comprising springs in said pockets for resiliently urging said vanes outward therefrom toward the inner surface of the cylindrical hollow of the piston; and means comprising a hydraulic cylinder and a hydraulic piston bearing on said rectangular hollow piston for moving the hollow piston from a position in which its cylindrical hollow is concentric with the rotatable shaft to a position in which it is eccentric thereof whereby said vanes may contact the inner surface of the cylindrical hollow and hydraulic braking force is exerted upon said rotatable shaft when the shaft and hollow are eccentric of each other.

References Cited in the file of this patent

UNITED STATES PATENTS

| | | |
|---|---|---|
| 466,660 | Duncan | Jan. 5, 1892 |
| 1,743,539 | Gasal | Jan. 14, 1930 |
| 1,917,972 | Henriot | July 11, 1933 |
| 2,035,465 | Erskine et al. | Mar. 31, 1936 |
| 2,064,421 | Erskine | Dec. 15, 1936 |
| 2,084,295 | Dayvolt | June 15, 1937 |
| 2,115,189 | Blocker | Apr. 26, 1938 |
| 2,236,556 | Wunderle | Apr. 1, 1941 |
| 2,238,786 | Warman | Apr. 15, 1941 |